US011614383B2

(12) United States Patent
Blaine et al.

(10) Patent No.: US 11,614,383 B2
(45) Date of Patent: Mar. 28, 2023

(54) SAMPLE COLLECTION SYSTEM AND PARTS THEREOF

(71) Applicant: MINEX CRC LTD, Kensington (AU)

(72) Inventors: Fredrick Allan Blaine, Innaloo (AU); Benjamin Graham Van Der Hoek, Oakden (AU)

(73) Assignee: MINEX CRC LTD, Kensington (AU)

( * ) Notice: Subject to any disclaimer, the term of this patent is extended or adjusted under 35 U.S.C. 154(b) by 423 days.

(21) Appl. No.: 15/733,016

(22) PCT Filed: Aug. 31, 2018

(86) PCT No.: PCT/AU2018/050938
§ 371 (c)(1),
(2) Date: Feb. 19, 2020

(87) PCT Pub. No.: WO2019/040990
PCT Pub. Date: Mar. 7, 2019

(65) Prior Publication Data
US 2020/0182749 A1    Jun. 11, 2020

(30) Foreign Application Priority Data

Sep. 1, 2017  (AU) ................................ 2017903541

(51) Int. Cl.
*G01N 1/18*  (2006.01)
*G01N 1/20*  (2006.01)

(52) U.S. Cl.
CPC ............. *G01N 1/18* (2013.01); *G01N 1/2035* (2013.01); *G01N 2001/205* (2013.01)

(58) Field of Classification Search
CPC .. G01N 1/18; G01N 1/2035; G01N 2001/205; G01N 2001/1025
(Continued)

(56) References Cited

U.S. PATENT DOCUMENTS 4,672,856 A    6/1987  Marrs et al.
4,771,641 A    9/1988  Beltrop et al.
(Continued)

FOREIGN PATENT DOCUMENTS

| AU | 199524990 A1 | 2/1996 |
| WO | WO-2005062702 A2 | 7/2005 |
| WO | WO-2011035377 A1 | 3/2011 |

OTHER PUBLICATIONS

International Search Report for International Application No. PCT/AU2018/050938, dated Sep. 21, 2018.
(Continued)

*Primary Examiner* — Robert R Raevis
(74) *Attorney, Agent, or Firm* — Marshall, Gerstein & Borun LLP

(57) ABSTRACT

The invention relates to a sample collection system for collecting sub-samples from a material stream, the system including a valve arrangement and a static cone splitter, and wherein the valve arrangement is arranged to enable operation of the static cone splitter to collect a non-biased sample of the material stream fed to the static cone splitter under first and second operational conditions, the first operational condition requiring the material stream to be at substantially atmospheric pressure and flowing at a minimum functional flow rate, and the second operational condition requiring the material stream to be pressurised above atmospheric pressure and at a flow rate higher than the minimum functional flow rate. The invention also relates to a static cone splitter for use with the system, together with a cone member for use with the static cone splitter.

9 Claims, 4 Drawing Sheets

(58) Field of Classification Search
USPC ............. 114/113; 73/863.41, 863.51, 863.52
See application file for complete search history.

(56) References Cited

U.S. PATENT DOCUMENTS

| | | |
|---|---|---|
| 5,241,867 A | 9/1993 | Cohen et al. |
| 5,426,987 A | 6/1995 | Sprenger |
| 2008/0105062 A1 | 5/2008 | Lennox Day |
| 2011/0023633 A1 | 2/2011 | Wihlborg |
| 2014/0366652 A1 | 12/2014 | Diehl et al. |

OTHER PUBLICATIONS

Written Opinion for International Application No. PCT/AU2018/050938, dated Sep. 21, 2018.
Australian Patent Office International-Type Search Report for National Application No. 2017903541, dated Aug. 21, 2018.
Examination Report for application No. 202000496 issued to Chile, dated Aug. 20, 2021.
Office Action for Chile patent application No. 202000496, dated Nov. 16, 2020.
Extended European Search Report issued in European Patent Office Application No. 18850114.2, dated Jul. 9, 2021.
First Examination Report issued to application No. 201880056920.1 issued to China, dated Aug. 31, 2022.

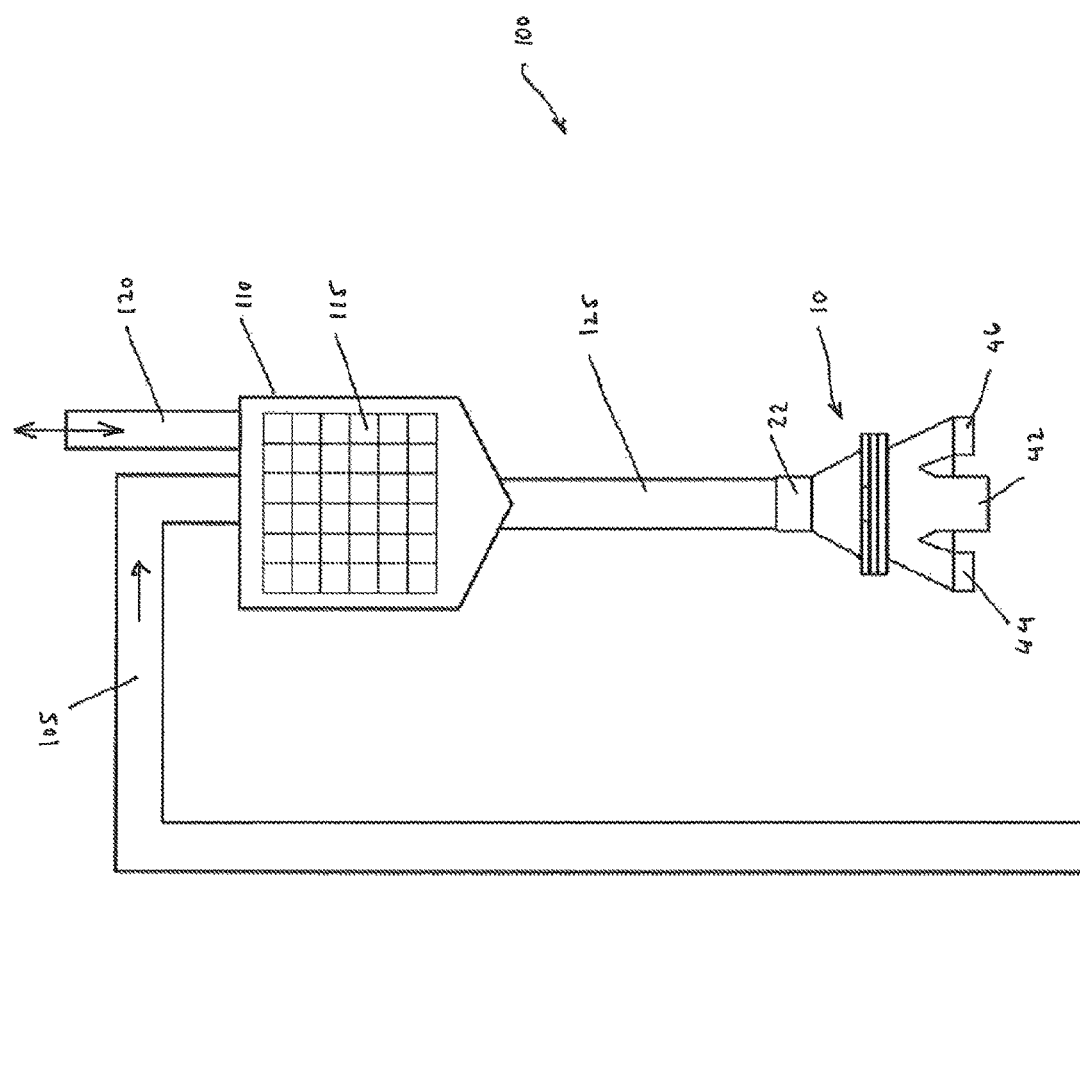

SAMPLE COLLECTION SYSTEM AND PARTS THEREOF

CROSS-REFERENCE TO RELATED APPLICATION

This is the United States national phase of International Patent Application PCT/AU2018/050938, filed Aug. 31, 2018, which claims priority to AU 2017903541, filed Sep. 1, 2017, the entire contents of each of which are incorporated herein by reference.

FIELD OF THE INVENTION

The present invention generally relates to a sample collection system for collecting samples from a material stream. The invention has particular, but not exclusive, application in collecting samples of geological materials.

BACKGROUND OF THE INVENTION

When collecting a geological sample from a material stream over a sample interval, it is important that the sample is truly representative of the sample interval and is not biased in any way (i.e. density, particle size etc.). In this way, characteristics of the sample determined by later testing can be reliably related to the whole of the interval and hence back to the actual source material.

Obtaining a representative sample of a material stream can be difficult for a variety of reasons. For example, variations in particle size and/or density, can impact sample collection. Furthermore, upstream material flow dynamics can impact on the sample actually collected by the sampler at the point of collection.

A variety of different sample collectors have been developed to date. Such collectors fall into two broad categories: mechanical and static. Mechanical samplers include a powered mechanism that periodically moves one or more sampling orifices through the material stream. That movement may adopt a linear motion such as that used in a cross-stream sampler, a rotary motion as used in a rotary-port splitter, rotary cone splitter or Vezin splitter, or an oscillatory motion. In contrast, a static sampler (sometimes referred to as a stationary sampler) has a static orifice that continuously intersects the material stream. Examples of static samplers include a riffle splitter, a cone splitter, and a launder box or shark-fin splitter.

Static splitters typically collect a proportion of the material stream constantly. However, they can be affected by preferential sampling or exclusion of material with certain physical properties due to material flow characteristics or poor mixing. For this reason, static splitters are not generally preferred over mechanical splitters which can collect a full cross-section of the material stream over a specific time interval. However, sampling of a material stream of particulate materials suspended in a flowing liquid via a mechanical splitter is not recommended as the sampling mechanism disturbs the flow and thus biases the sample.

In some instances, it may be preferable to take a continuous subsample of the material stream. This may be the case when changes in the material over very short time scales is the feature of interest (e.g. as is the case when sampling material produced from coiled tubing drilling). However, again, this sample must not be biased by the sampling method.

Static cone splitters are a type of static splitter which were commonly used for taking a sub-sample of dry particulate material or particulate material with a low concentration of liquid (i.e. <10% liquid). However, in more recent times, rotary cone splitters and other variants are more commonly used when sampling such materials.

In their general implementation, static cone splitters are not recommended for sampling of liquid or particulate materials suspended in a flowing liquid (e.g. a material stream of the type produced through coiled tubing drilling). This is due to the potential for disturbed or preferential flow paths therewithin, siphoning, air entrainment, and their inability to function accurately over varying flow velocities. All of these factors impart biasing of the sample collected.

The present invention seeks to provide an improved sample collection system for collecting a continuous sub-sample of a material stream, and an improved static cone splitter.

The discussion of the background to the invention herein is included to explain the context of the invention. This is not to be taken as an admission that any of the material referred to was published, known or part of the common general knowledge as at the priority date of this application.

SUMMARY OF THE INVENTION

According to a first aspect of the present invention there is provided a sample collection system for collecting sub-samples from a material stream, said system including a valve arrangement and a static cone splitter, and wherein the valve arrangement is arranged to enable operation of the static cone splitter to collect a non-biased sample of the material stream fed to the static cone splitter under first and second operational conditions, the first operational condition requiring the material stream to be at substantially atmospheric pressure and flowing at a minimum functional flow rate, and the second operational condition requiring the material stream to be pressurised above atmospheric pressure and at a flow rate higher than the minimum functional flow rate.

In relation to terminology, reference throughout this specification will be made to a "material stream". The phrase "material stream" is used to reference a stream of liquid in which particulate material is transported. Further, the term "minimum functional flow rate" is the lowest flow rate expected during system operation for which a representative sub-sample is required and under which a representative sub-sample cannot be guaranteed. The term "maximal functional flow rate" is the maximum expected flow rate of the system for which a representative sub-sample is required and over which a representative sub-sample cannot be guaranteed.

In accordance with an embodiment of this aspect of the invention, the valve arrangement is a passive component that operates automatically dependant on the flow rate of the material stream. The valve arrangement preferably includes an air valve which, at the minimum functional flow rate of the material stream, remains open allowing air to enter the valve arrangement to allow the material stream to flow without restriction at substantially atmospheric pressure. In this first operational condition, no vacuum is generated in the system and thus a reverse flow of air into the system via a sample outlet tube or a waste outlet tube of the static cone splitter is prevented. If such a vacuum was to occur, reverse flow of the material stream through the system would cause imbalance between the sample outlet tube and the waste outlet tube causing uneven flow of the material stream through the static cone splitter and hence the collection of a biased sample.

At higher flow rates (i.e. at flow rates higher than the minimum functional flow rate), the air valve is arranged to allow the evacuation of air from the system until the system is full of material stream at which point the air valve closes. Once closed, the system operates as a pressurized system at higher flow rates without the entrainment of air. Whilst operating as a pressurized system, the material stream is pushed through the static cone splitter and remains pressurized up to the point of passing a cone member of the cone splitter. The cone member includes openings that divide the material stream into sub-streams. After that point, the material stream is broken into sub-streams including at least one waste stream and at least one sample stream which each flow at atmospheric pressure. The waste streams and sample streams flow through the respective waste and sample outlet tubes freely under the action of gravity. This allows the system to maintain a balance of pressure between outlets of the waste and sample outlet tubes and hence the openings of the cone member. This results in a balanced and unbiased split of the material stream into the various sub-streams.

In accordance with an embodiment of the invention, the material stream is arranged to flow into a chamber prior to entry into the static cone splitter. The valve arrangement is connected to the chamber distal from the cone splitter. The cone splitter is located substantially vertically below the chamber and is connected thereto by a substantially vertical chamber exit pipe.

The vertical chamber exit pipe connects to an inlet tube of the static cone splitter. The inlet tube has a cross-sectional flow area that is defined by the minimum functional flow rate of the system and is sized such that the unrestricted flow by gravity of the material stream through the inlet tube is substantially equal to or less than the minimum functional flow rate of the system without overly restricting the system flow. In this way, the inlet tube will remain charged with material stream during use of the sample collection system for flow rates equal to or greater than the minimum functional flow rate.

The sample collection system of an embodiment of the invention is preferably configured to receive the material stream at a flow rate of greater than about 60 litres per minute and less than about 150 litres per minute. However, it should be understood that the scale of the collection system and the various components thereof can be varied to accommodate material streams at other flow rates.

The invention provides in a second aspect a static cone splitter including an upper housing, a cone member and a lower housing, the cone member including a slant surface and at least two blades, said at least two blades defining at least in part a first and a second opening of equal flow area, the first opening being a sub-sample opening and the second opening being a waste opening, wherein the cone splitter is configured so that in use the material stream entering the upper housing is directed into contact with the slant surface and then a portion of the material stream after contacting the slant surface is directed through the sub-sample opening and is arranged to exit from the cone splitter via a sample outlet tube, the remaining material stream forming a waste stream which is directed through said waste opening, and the flow resistance of the portions of the material stream about the slant surface at entry into the openings is substantially equal.

In accordance with an embodiment of the second aspect of the invention, the slant surface is established by or formed on a cone shaped component. The cone shaped component is preferably located centrally of the cone member.

Preferably, the upper housing includes an inlet tube through which the material stream is arranged to pass. The longitudinal central axis of the inlet tube is preferably centrally aligned with the longitudinal central axis of the cone member so that the entire material stream entering the upper housing is directed into contact with the slant surface.

Preferably, the inlet tube has a circular cross-sectional configuration of a diameter less than a base diameter of the slant surface. Accordingly, when the slant surface is established by the cone shaped component, the cone shaped component will have a base diameter greater than the cross-sectional diameter of the inlet tube. Accordingly, the complete material stream entering the cone splitter via the inlet tube will make contact with a portion of the slant surface of the cone member.

Preferably, the inlet tube has a cross-sectional area sized such that the unrestricted flow by gravity of the material stream through the inlet tube is substantially equal to or less than a minimum functional flow rate of an infeed system. In this way, the inlet tube will remain charged with material stream during use ensuring the material stream contacts the slant surface of the cone member with a substantially circular cross-sectional profile.

The cone shaped component of the cone member and the interior wall of the upper housing establish a chamber located above the blades of the cone member. The chamber thus adopts an annular shape.

Preferably, the interior wall of the upper housing that bounds the chamber extends at any point substantially parallel to the plane of the opposed point of the slant surface. In this way, the width of the chamber, that is the width between the inner wall of the upper housing and the immediately opposed slant surface of the cone member, is constant in the direction of flow through the cone splitter (i.e. the planar cross-sectional configuration of the chamber as viewed in the direction of flow). This configuration ensures that any portion of the material stream is not inadvertently entrained within the chamber.

Preferably, the waste stream is arranged to exit from the cone splitter via an outlet in the lower housing. The outlet is preferably connected to a single outlet tube.

Preferably, the blades of the cone member extend radially outwardly of the longitudinal central axis of the cone shaped component. Each blade is preferably configured so as to intersect the flow of the material stream substantially perpendicularly. The blades are spaced about the cone shaped component so that the openings therebetween are of equal flow area. Most preferably, the openings have substantially the same planar cross-sectional configuration (i.e. are of the same shape and size) in the direction of flow. This ensures that the flow resistance of the material stream about the slant surface at entry into the openings established at least in part by the blades is substantially equal. This facilitates unbiased sampling of the material stream entering the cone splitter. To this end, each blade is preferably identical in size and shape.

Preferably the openings are dimensioned such that the minimum opening dimension is at least three times the maximum dimension of the largest particle size expected in the material stream. Such an arrangement is provided to prevent blockage of the openings.

Embodiments of the invention may include two or more blades, with the number of blades varying the percentage of the material stream passing through each opening of the cone member. In one embodiment, eight blades are provided so as to divide the material stream into eight equally sized parts or sub-streams and thus 12.5% of the material stream will pass through each opening. In accordance with such an arrangement, the sub-sample collected via the sample outlet tube represents 12.5% of the material stream. Preferably, the cone splitter would include two sample outlets so that two sub-samples could be separately collected from the material stream. The two sub-samples are preferably collected from diametrically opposed openings. In accordance with such a preferred embodiment, the two sample outlets preferably each have a cross-sectional area such that the unrestricted flow due to gravity is greater than 12.5% of the maximum functional flow rate of the infeed system. Such a configuration is advantageous as it will prevent siphoning due to unequal pressures between the sample outlets and the outlet tube through which the waste stream passes.

The waste outlet preferably has a cross-sectional area such that the unrestricted flow due to gravity is greater than 75% of the maximum functional flow rate of the sample stream to prevent siphoning due to unequal pressures between the sample outlets and the outlet tube through which the waste stream passes.

In a third aspect the invention provides a cone member for a static cone splitter for collecting sub-samples from a material stream, said cone splitter including an upper housing and a lower housing, the cone member including a slant surface and at least two blades, said at least two blades defining at least in part a first and a second opening of equal flow area, the first opening being a sub-sample opening and the second opening being a waste opening, wherein the cone member is configured so that in use of the cone splitter the material stream entering the upper housing is directed into contact with the slant surface of the cone member and then a portion of the material stream after contacting the slant surface is directed through the sub-sample opening and is arranged to exit from the cone splitter via a sample outlet tube, the remaining material stream forming a waste stream which is directed through said waste opening, and the flow resistance of the portions of the material stream about the slant surface at entry into the openings is substantially constant.

A fourth aspect of the invention provides a method of collecting a sub-sample from a material stream using a sample collection system according to the first aspect of the invention.

BRIEF DESCRIPTION OF DRAWINGS

Embodiments of the invention will now be described, by way of example only, with reference to the accompanying drawings in which:

FIG. 8 illustrates a sample collection system according to an embodiment of another aspect of the invention.

DETAILED DESCRIPTION OF DRAWINGS

Figure 1:
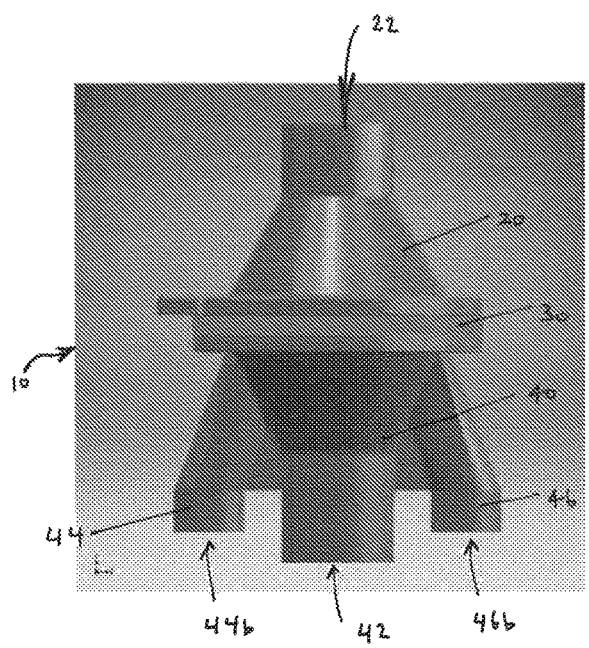
FIG. 1 is a front view of a static cone splitter according to an embodiment of one aspect of the invention.
Figure 2:
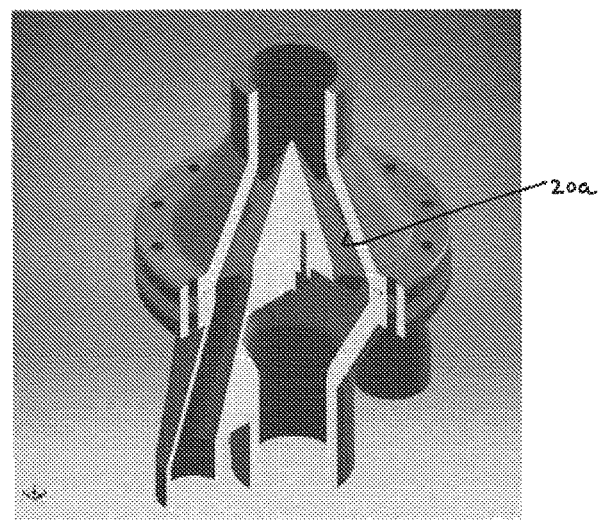
FIG. 2 is an oblique cut-away view of the cone splitter shown in FIG. 1.

As shown in the Figures, a static cone splitter 10 in accordance with an embodiment of the invention includes an upper housing 20, a cone member 30 and a lower housing 40. The upper housing 20, cone member 30 and lower housing 40 are assembled so that in use of the cone splitter 10 a material stream enters the cone splitter 10 via an inlet 22 of the upper housing 20. As illustrated, inlet 22 has a circular cross-sectional configuration, although other configurations are envisaged.

The cone member 30 includes a slant surface established on a central cone shaped component 32 (hereafter referred to as cone 32), eight blades 34 and a flange 36. The eight blades 34 define, at least in part, eight different openings 38.

In accordance with the illustrated embodiment of the invention, the material stream enters the cone splitter 10 and is then divided into six waste streams and two sub-sample streams. The six waste streams join together below the cone member 30 after passing through their respective opening and exit the cone splitter via outlet tube 42. Each sub-sample stream exits via a respective sample outlet tube 44, 46. As shown in FIG. 1, sample outlet tube 44 is located to the left of the outlet tube 42 and sample outlet tube 46 is located to the right of the outlet tube 42. The sample outlet tubes 44, 46 are located symmetrically about the outlet tube 42 so as to establish a symmetrical configuration.

Figure 5:
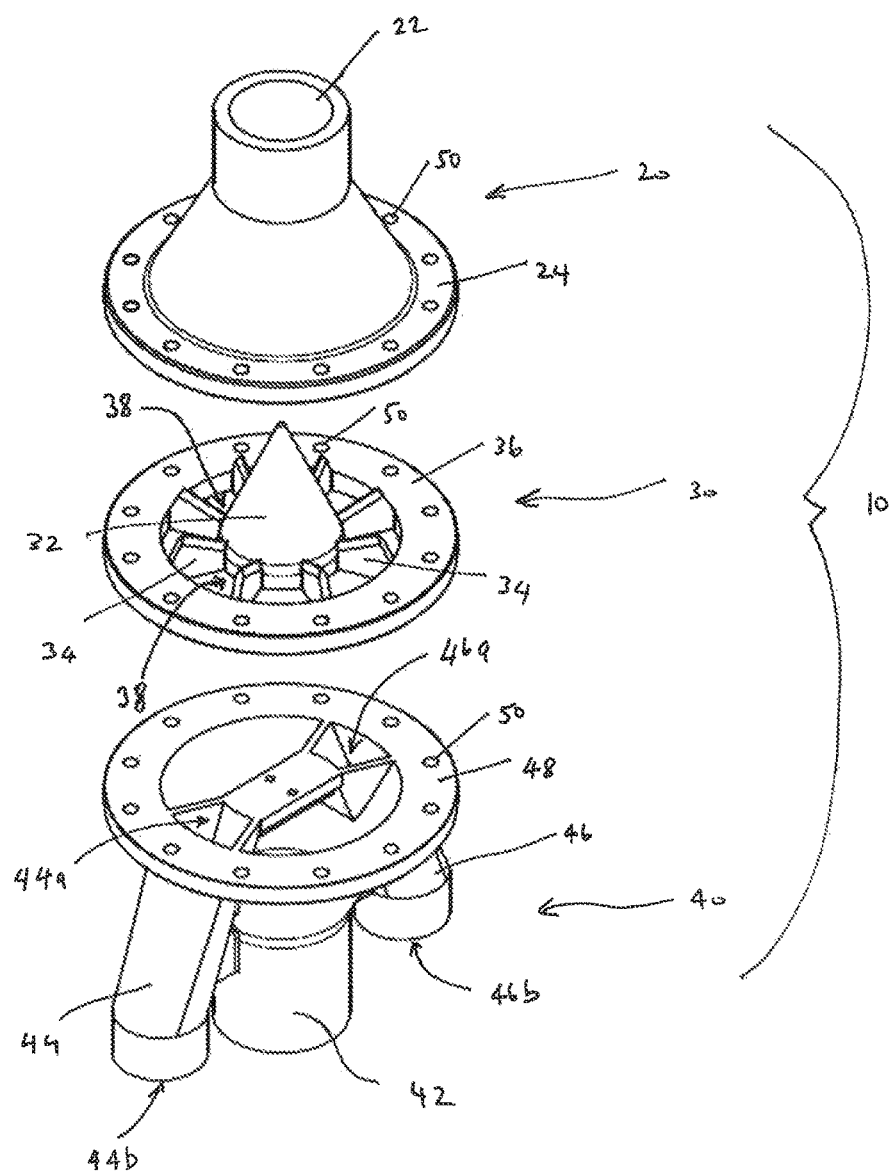
FIG. 5 is an assembly view of the cone splitter shown in FIG. 1.
Figure 6:
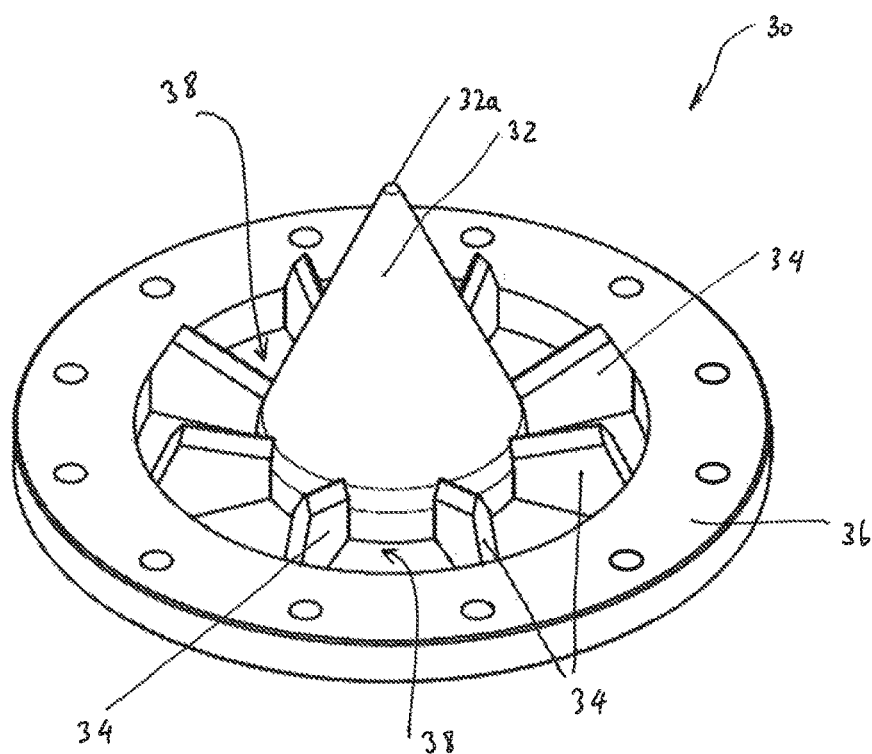
FIG. 6 is an enlarged isometric view of the cone member of the cone splitter shown in FIG. 5.

Sample outlet tube 44 has an upper opening 44a and a lower opening 44b. Sample outlet tube 46 has an upper opening 46a and a lower opening 46b. The shape of the upper opening 44a, 46a of each of the sample outlet tubes 44, 46 is best shown in FIG. 5.

In use of the cone splitter 10, outlet tube 42 of the lower housing 40 may be connected to appropriate pipework to enable the waste stream to be appropriately dealt with. Alternatively, outlet tube 42 may dispense the waste stream to the ground, a container or other reservoir. Similarly, the first and second sample outlet tubes 44, 46 of the lower housing 40 may be connected to appropriate pipework to enable collection of the respective sub-sample stream. Alternatively, each sample outlet tube 44, 46 may dispense the sub-sample stream to a container or other sample collection arrangement.

When the upper housing 20, cone member 30 and lower housing 40 are assembled together, the flange 36 of the cone member 30 is located between a flange 24 of the upper housing 20 and a flange 48 of the lower housing 40. Bolts (not shown) pass through respective aligned apertures 50 in the respective flanges 24, 36, 48 and are used to secure the assembled parts together.

In use, the cone member 30 is orientated so that an apex or tip 32a of the cone 32 is located upwardly in the direction of the inlet tube 22. The apex or tip 32a may be pointed or rounded with a small radius (e.g. 1.5 mm radius). The longitudinal central axis of the cone 32 is also coincident with the longitudinal central axis of the inlet tube 22 of the upper housing 20.

Figure 3:
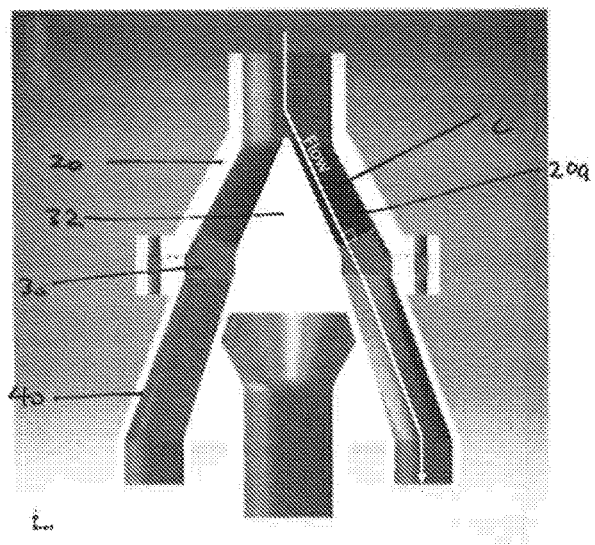
FIG. 3 is a front cut-away view of the cone splitter shown in FIG. 1.
Figure 4:
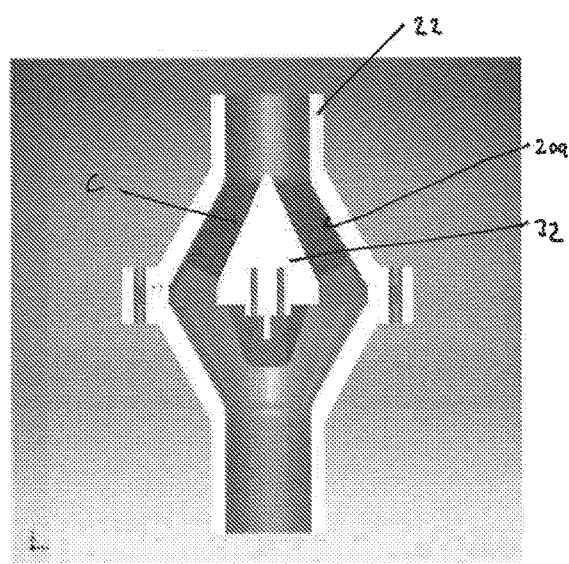
FIG. 4 is a side cut-away view of the cone splitter shown in FIG. 1.

The cone 32 of the cone member 30 and the interior wall 20a of the upper housing 20 establish a chamber C above the blades 34. This chamber C is best illustrated in FIGS. 3 and 4 and has an annular shape. As illustrated, the interior wall 20a bounding the chamber C extends substantially parallel to the plane of the slant surface of the cone 32 at any point thereabout. This configuration ensures that any portion of the material stream is not inadvertently entrained within the chamber C.

The cone 32 has a base diameter larger than the diameter of the inlet 22 of the upper housing 20 so that all of the material stream flowing into the interior of the cone splitter 10 via the inlet 22 will be directed onto and will come into contact with some portion of the slant surface of the cone 32.

It is preferable to establish the cone angle of the cone 32 as high as possible to reduce back pressure within the chamber C of the cone splitter 10.

Figure 7:
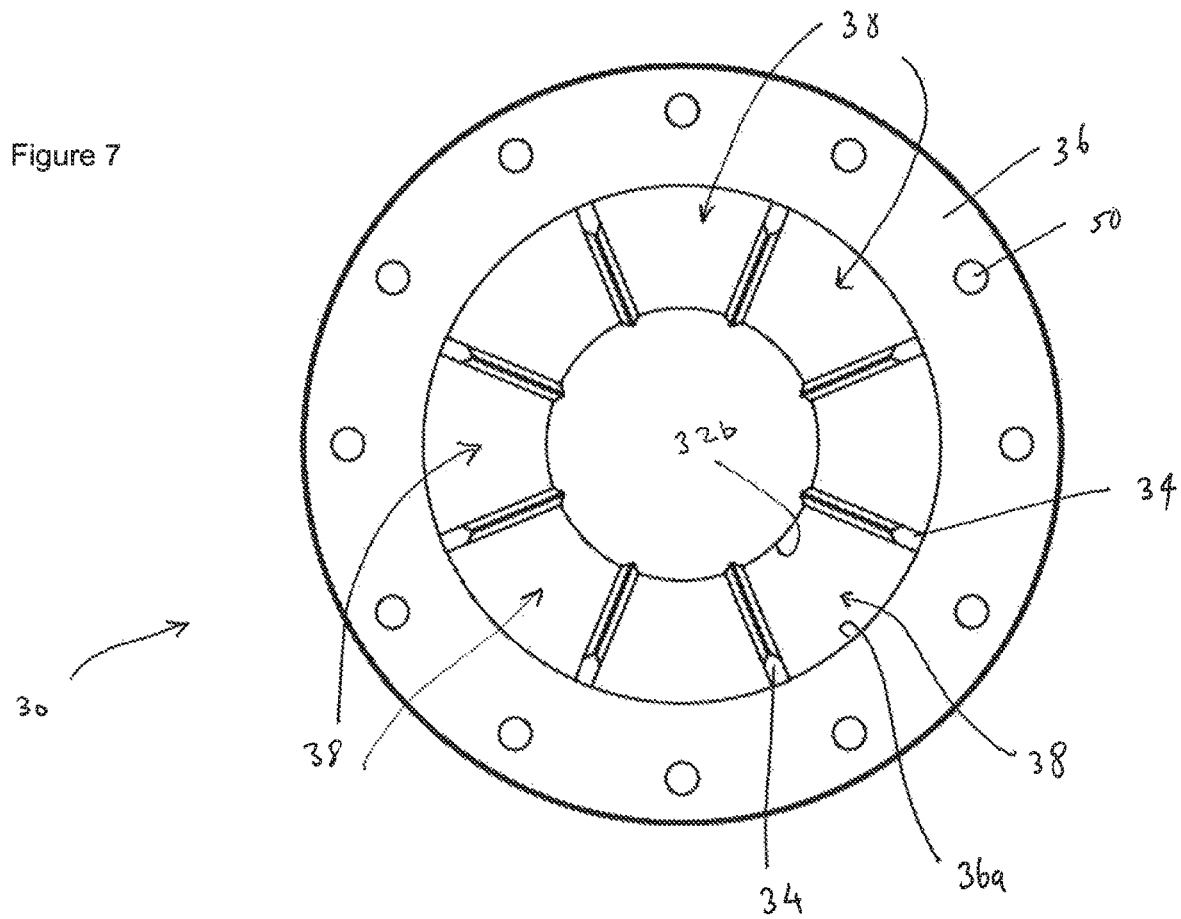
FIG. 7 is an enlarged plan view of the cone member shown in FIG. 6.

As best shown in FIG. 7, the eight blades 34 extend radially of the longitudinal central axis of the cone 32. The blades 34 are equally spaced around the cone 32 and are angled so as to intersect the flow of the material stream substantially perpendicularly. This perpendicular intersection is shown in FIG. 3.

After contacting a portion of the slant surface of the cone 32, the flow of the material stream is redirected and then passes through the openings 38 located between the adjacent blades 34 of the cone member 30. Accordingly, the blades 34 divide the material stream into eight equally sized parts or sub-streams and thus 12.5% of the material stream will pass through each of the openings 38.

As shown, each opening 38 is bounded by the associated adjacent blades 34, a part 32b of the base of the cone 32, and a part 36a of the flange 36. The planar shape of the openings 38 as viewed from above is best illustrated in FIG. 7. As clearly shown, the shape and size of each opening is identical.

It should be noted from FIG. 5, that the upper opening 44a, 46a of each of the first and second sample outlet tubes 44, 46 mimic the planar shape of the openings 38. Further, when the flange 36 of the cone member 30 is located on the flange 48 of the lower housing 40, the upper openings 44a, 46a of the sample outlet tubes 44, 46 are located so as to align with respective ones of the openings 38 of the cone member 30. These particular openings 38 are thus referred to hereafter as the sub-sample openings. Accordingly, during use of the illustrated cone splitter 10, any portion of the sample stream that passes through the sub-sample openings is diverted to the respective aligned sample outlet tubes 44, 46 for collection.

It will be appreciated by a person skilled in that art that the arrangement disclosed ensures that the flow resistance of the portions of the material stream about the slant surface of the cone member 30 at entry to the openings 38 is arranged to be substantially equal. Accordingly, the flow characteristic of the material stream at entry through the openings 38 is substantially identical and thus an unbiased sample of the total material stream will flow for collection via the sub-sample openings into the sample outlet tubes 44, 46.

In accordance with the illustrated embodiment, two sub-samples each representative of 12.5% of the total material stream can be simultaneously collected with the remaining 75% ultimately divested to the outlet tube 42. However, it will be appreciated that different configurations are possible. For example, only a single sample outlet tube may be provided and/or the number of blades of the cone member can be varied to correspondingly vary the percentage of the sub-sample flow actually collected by the or each of the sample outlet tubes of the cone splitter.

FIG. 8 illustrates a sample collection system 100 in accordance with an embodiment of the invention. The sample collection system 100 includes pipework 105 through which a material stream is arranged to flow, a chamber 110 fitted with a course screen 115, a valve arrangement 120, a chamber exit pipe 125, and a static cone splitter 10. The static cone splitter 10 of this embodiment adopts the form described previously in connection with FIGS. 1 to 7.

As illustrated in FIG. 8, the chamber 110 is connected via the chamber exit pipe 125 to the inlet tube 22 of the static cone splitter 10. The chamber 110 is located substantially vertically above the static cone splitter 10 and is of a larger diameter than the diameter of the exit pipe 125. Chamber 110 is arranged to collect the material stream prior to it flowing into the cone splitter 10.

The chamber 110 includes the course screen 115 which is capable of screening out oversize material contained in the material stream that would otherwise block flow through the cone splitter 10. The screen 115 would be removable for cleaning. The use of other arrangements to screen out oversize material from the material stream is envisaged. Further, it is envisaged that such screening arrangements may be excluded.

The chamber 110 has a base 102 which adopts a conical shape to prevent build-up of particulate material thereon. Other base configurations are envisaged.

Valve arrangement 120 is located at the top 104 of the chamber 100 and distal from the cone splitter 10. The valve arrangement 120 is configured to enable the break of any vacuum established within the system 100 and to provide a discharge point for excess material stream in the event that the flow rate through the system 100 is too high to be handled by the chamber 110. In accordance with an embodiment of the invention the valve arrangement 120 includes an air valve.

The sample collection system 100 is preferably arranged to receive the material stream at an operating flow rate greater than about 60 litres per minute and up to about 150 litres per minutes. The upper flow rate limit of the system according to the described embodiment of the invention is generally limited to a rate at which back pressure on the bore hole and the equipment is less than about 1 Bar.

The relative diameters of the chamber 110 and exit pipe 125 and the location of the valve arrangement 120 at the top of the chamber 100 allows material stream to flow through the chamber 110 and into the cone splitter 10, with any vacuum broken and without excess air being drawn into the chamber 110. This is because the air flowing via the valve arrangement 120 is not in direct contact with the material stream.

The length direction of the exit pipe 125 from the chamber 110 extends substantially vertically and directs the material stream into the inlet tube 22 of the static cone splitter 10. The exit pipe 125 is a short vertical pipe with a length of approximately 300 mm. This compares with a chamber 110 having a diameter of about 200 mm and a height of about 300 mm.

During operation of the system 100, the material stream from a drilling operation is fed via pipework 105 into the chamber 110. The chamber 110 is located generally vertically above and centrally of the inlet 22 of the upper housing 20 of the cone splitter 10. Preferably, the material stream is supplied at a flow rate of greater than about 60 litres per minute. This ensures that there is always a substantially constant and uniform distribution of liquid and cuttings in the material stream when it enters the inlet 22 of the cone splitter 20.

Embodiments of the invention are advantageous because they enable collection of a non-biased sample of a material stream. Further, the system does not include any moving parts and thus the system is less likely to break down. Further, the system requires no external power supply to operate. If the cone 32 of the static cone splitter 10 becomes damaged, the cone member 30 can be easily and quickly replaced and thus down time for the system is only minor.

Embodiments of the invention are capable of collecting smaller sample sizes (i.e. a smaller percentage of the total material stream) and are not flow rate dependent. Further, embodiments of the invention enable reliable sampling of a material stream with greater than 90% liquid, such as that generated in coiled tubing drilling.

The embodiments have been described by way of example only and modifications within the spirit and scope of the invention are envisaged.

The invention claimed is:

1. A sample collection system for collecting sub-samples from a material stream, said system including a valve arrangement and a static cone splitter, and wherein the valve arrangement is arranged to enable operation of the static cone splitter to collect a non-biased sample of the material stream fed to the static cone splitter under first and second operational conditions, the first operational condition occurring when the material stream is at substantially atmospheric pressure and flowing at a minimum functional flow rate, and the second operational condition occurring when the material stream is pressurized above atmospheric pressure and at a flow rate higher than the minimum functional flow rate,
    wherein the valve arrangement includes an air valve which, at the minimum functional flow rate of the material stream, remains open allowing air to enter the valve arrangement to allow the material stream to flow without restriction at substantially atmospheric pressure, and
    wherein at flow rates higher than the minimum functional flow rate the air valve is arranged to allow the evacuation of air from the system until the system is full of material stream at which point the air valve closes.

2. A sample collection system according to claim 1 wherein the valve arrangement is a passive component that operates automatically dependent on the flow rate of the material stream.

3. A sample collection system according to claim 1 further including a chamber, and wherein the material stream is arranged to flow into the chamber before entry into the static cone splitter.

4. A sample collection system according to claim 3 wherein the valve arrangement is connected to the chamber distal from the cone splitter.

5. A sample collection system according to claim 3 wherein the cone splitter is located substantially vertically below the chamber and is connected thereto by a substantially vertical chamber exit pipe.

6. A sample collection system according to claim 5 wherein the vertical chamber exit pipe connects to an inlet tube of the static cone splitter.

7. A sample collection system according to claim 6 wherein the inlet tube has a cross-sectional flow area sized such that the unrestricted flow by gravity of the material stream through the inlet tube is substantially equal to or less than the minimum functional flow rate of the system.

8. A sample collection system according to claim 1 configured to receive the material stream at a flow rate of greater than about 60 litres per minute.

9. A sample collection system according to claim 1 comprises an upper housing, a cone member and a lower housing, the cone member including a slant surface and at least two blades, said at least two blades defining at least in part a first and a second opening of equal flow area, the first opening being a sub-sample opening and the second opening being a waste opening, wherein the cone splitter is configured so that in use the material stream entering the upper housing is directed into contact with the slant surface and then a portion of the material stream after contacting the slant surface is directed through the sub-sample opening and is arranged to exit from the cone splitter via a sample outlet tube of the lower housing, the remaining material stream forming a waste stream which is directed through said waste opening, and the flow resistance of the portions of the material stream about the slant surface at entry into the openings is substantially equal.

* * * * *